United States Patent
Ota et al.

(10) Patent No.: US 10,927,942 B1
(45) Date of Patent: Feb. 23, 2021

(54) POWER TRANSMISSION DEVICE

(71) Applicant: TOYOTA JIDOSHA KABUSHIKI KAISHA, Toyota (JP)

(72) Inventors: Atsuharu Ota, Mishima (JP); Yuji Iwase, Mishima (JP); Mitsuhiro Tabata, Sunto-gun (JP); Yoshiaki Miyazato, Sunto-gun (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 0 days.

(21) Appl. No.: 16/906,512

(22) Filed: Jun. 19, 2020

(30) Foreign Application Priority Data

Aug. 9, 2019 (JP) .............................. JP2019-147933

(51) Int. Cl.
*F16H 57/04* (2010.01)
*F16H 1/28* (2006.01)
*F16H 57/08* (2006.01)

(52) U.S. Cl.
CPC .......... *F16H 57/0427* (2013.01); *F16H 1/28* (2013.01); *F16H 57/043* (2013.01); *F16H 57/0479* (2013.01); *F16H 57/082* (2013.01)

(58) Field of Classification Search
CPC . F16H 57/0427; F16H 57/0479; F16H 57/082
See application file for complete search history.

(56) References Cited

U.S. PATENT DOCUMENTS

| | | | | | |
|---|---|---|---|---|---|
| 4,480,492 | A | * | 11/1984 | Fujioka | F16H 57/0427 184/6.12 |
| 4,615,231 | A | * | 10/1986 | Takahashi | F16H 57/0427 74/467 |
| 5,242,033 | A | * | 9/1993 | Toraason | F16H 57/0412 184/6.12 |
| 5,976,048 | A | * | 11/1999 | Sudau | F16F 15/1206 464/68.3 |
| 7,510,498 | B2 | * | 3/2009 | Shimizu | F16H 1/227 475/331 |
| 9,404,420 | B2 | * | 8/2016 | Gallet | F16H 57/0456 |
| 2006/0068961 | A1 | * | 3/2006 | Haka | F16H 57/0479 475/159 |
| 2009/0179387 | A1 | * | 7/2009 | Saenz De Ugarte | F16J 15/441 277/563 |

(Continued)

FOREIGN PATENT DOCUMENTS

| | | |
|---|---|---|
| JP | 2007-270865 A | 10/2007 |
| JP | 2010-019273 A | 1/2010 |

*Primary Examiner* — Sherry L Estremsky
(74) *Attorney, Agent, or Firm* — Oliff PLC

(57) ABSTRACT

A power transmission device includes: a planetary gear mechanism having a sun gear, a ring gear, a plurality of pinion gears meshing with the ring gear, a pinion shaft rotatably supporting the pinion gear, and a carrier plate holding the pinion shaft, the pinion shaft having an opening that is open on one end portion in an axial direction and an oil passage that communicates with the opening and supplies lubricant flowing from the opening to an inner peripheral surface of the pinion gear; and an oil receiver, which is attached to the carrier plate, receiving lubricant, which is scattered outward in a radial direction of the ring gear from a meshing portion between the pinion gear and the ring gear at a time of rotation of the pinion gear, and guiding the lubricant to the opening.

4 Claims, 11 Drawing Sheets

(56) References Cited

U.S. PATENT DOCUMENTS

2011/0230292 A1* 9/2011 Komatsu ............ F16H 57/0427
475/5
2019/0226575 A1* 7/2019 Kurz-Hardjosoekatmo ................
F16H 1/28

* cited by examiner

US 10,927,942 B1

POWER TRANSMISSION DEVICE

CROSS-REFERENCE TO RELATED APPLICATION(S)

The present application claims priority to and incorporates by reference the entire contents of Japanese Patent Application No. 2019-147933 filed in Japan on Aug. 9, 2019.

BACKGROUND

The present disclosure relates to a power transmission device.

Japanese Laid-open Patent Publication No. 2010-019273 discloses that a power transmission device having a planetary gear mechanism includes a pinion shaft held on a carrier plate of the planetary gear mechanism, a pinion gear rotatably supported on the pinion shaft, and an oil receiver attached to the carrier plate, and lubricant collected by the oil receiver is supplied to an inner peripheral surface of the pinion gear. In the configuration disclosed in Japanese Laid-open Patent Publication No. 2010-019273, the pinion shaft has an opening that is open at one end portion in an axial direction, and an oil passage that communicates with the opening and supplies the lubricant to the inner peripheral surface of the pinion gear, and when the carrier plate is stopped, the lubricant dripping by gravity in the case is collected by the oil receiver and guided to the opening of the pinion shaft.

SUMMARY

There is a need for providing a power transmission device capable of supplying a sufficient amount of lubricant to an inner peripheral surface of a pinion gear when the pinion gear of a planetary gear mechanism rotates.

According to an embodiment, a power transmission device includes: a planetary gear mechanism having a sun gear, a ring gear, a plurality of pinion gears meshing with the ring gear, a pinion shaft rotatably supporting the pinion gear, and a carrier plate holding the pinion shaft, the pinion shaft having an opening that is open on one end portion in an axial direction and an oil passage that communicates with the opening and supplies lubricant flowing from the opening to an inner peripheral surface of the pinion gear; and an oil receiver, which is attached to the carrier plate, receiving lubricant, which is scattered outward in a radial direction of the ring gear from a meshing portion between the pinion gear and the ring gear at a time of rotation of the pinion gear, and guiding the lubricant to the opening.

DETAILED DESCRIPTION

In the configuration disclosed in Japanese Laid-open Patent Publication No. 2010-019273, since the opening of the oil receiver is open outward in the radial direction of the carrier plate, the lubricant flowing from an upper side to a lower side in an up-down direction of the case can be collected at the opening of the oil receiver, but when the opening faces downward in the up-down direction, the lubricant cannot be collected at the opening, and there is room for improvement in terms of collection efficiency.

Hereinafter, a power transmission device according to an embodiment of the disclosure will be specifically described with reference to the accompanied drawings. Note that the disclosure is not limited to the embodiment described below.

Figure 1:
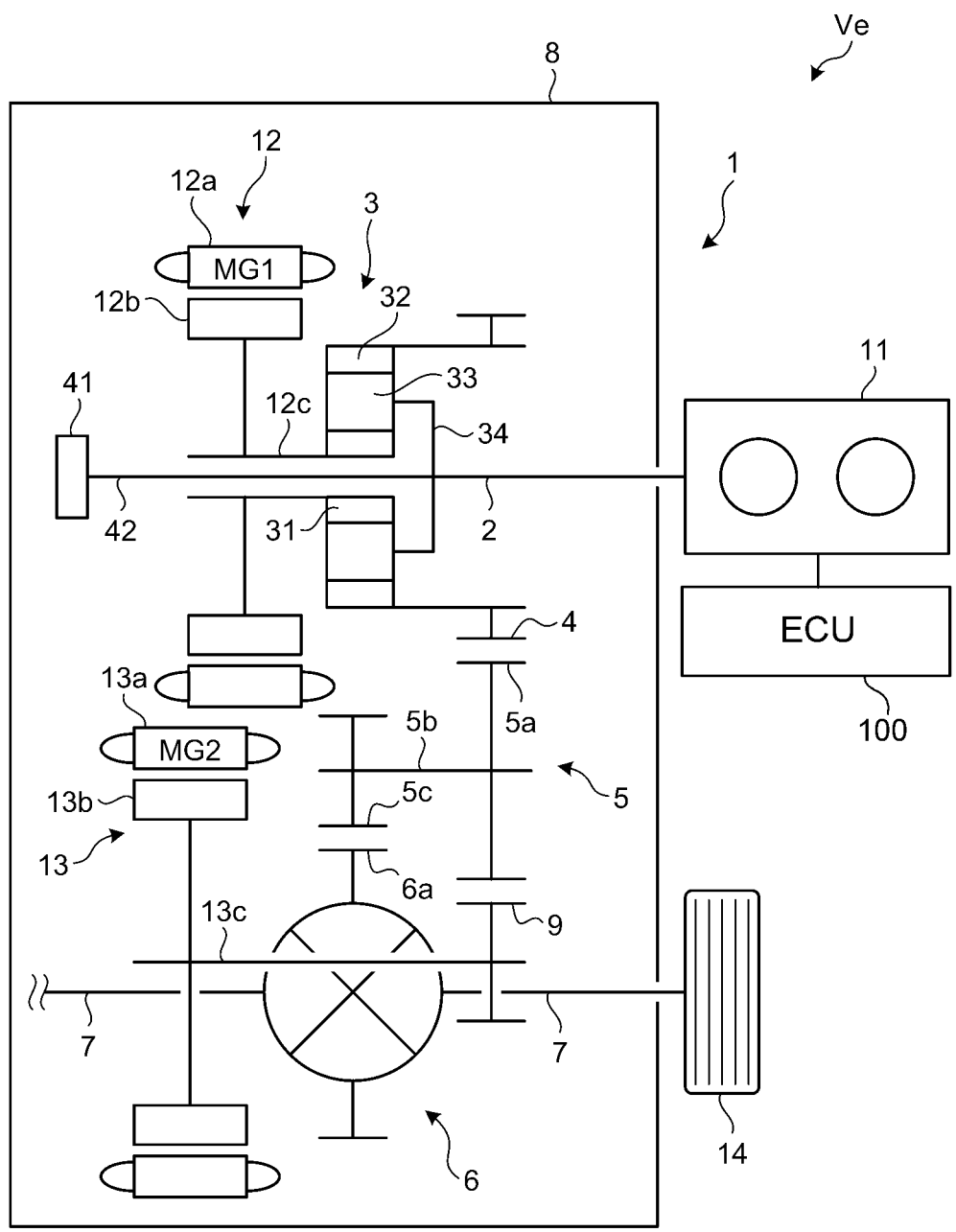
FIG. 1 is a skeleton diagram schematically illustrating a vehicle equipped with a power transmission device of an embodiment.

FIG. 1 is a skeleton diagram schematically illustrating a vehicle equipped with a power transmission device of the embodiment. A power transmission device 1 is a device that is mounted on a vehicle Ve and transmits power output from a power source to drive wheels.

The power transmission device 1 includes an input shaft 2, a planetary gear mechanism 3, an output gear 4, a counter gear mechanism 5, a differential gear mechanism 6, a drive shaft 7, and a transaxle case (hereinafter, simply referred to as a case) 8. The planetary gear mechanism 3, the counter gear mechanism 5, and the differential gear mechanism 6 are housed inside the case 8.

The vehicle Ve is a hybrid vehicle including an engine 11, a first motor (MG1) 12, and a second motor (MG2) 13 as power sources. Each of the motors 12 and 13 is a well-known motor generator having a motor function and a power generation function, and is electrically connected to a battery via an inverter (neither is illustrated). In the vehicle Ve, the power output from the power source is transmitted to wheels 14 via the power transmission device 1.

The vehicle Ve includes the planetary gear mechanism 3 that functions as a power split mechanism in a power transmission path from the engine 11 to the wheels 14. In the vehicle Ve, the power output by the engine 11 can be divided into the first motor 12 side and the wheel 14 side by the planetary gear mechanism 3 as the power split mechanism. In this case, the first motor 12 generates electric power by the power output by the engine 11, and the electric power is stored in the battery or supplied to the second motor 13 via the inverter.

The input shaft 2, the planetary gear mechanism 3, and the first motor 12 are arranged on the same axis as the crankshaft of the engine 11. The crankshaft and the input shaft 2 are connected via a torque limiter (not illustrated) or the like. The first motor 12 is arranged adjacent to the planetary gear mechanism 3 and on a side opposite to the engine 11 in the axial direction. The first motor 12 includes a stator 12a around which a coil is wound, a rotor 12b, and a rotor shaft 12c.

The planetary gear mechanism 3 is a differential mechanism having a plurality of rotating elements, and is a single pinion type planetary gear mechanism in the example illustrated in FIG. 1. The planetary gear mechanism 3 includes, as three rotating elements, a sun gear 31 which is an external gear, a ring gear 32 which is an internal gear arranged concentrically with the sun gear 31, and a carrier 34 which holds a pinion gear 33 meshing with the sun gear 31 and the ring gear 32 such that the pinion gear 33 is able to rotate and revolve around the sun gear 31.

The rotor shaft 12c of the first motor 12 is connected to the sun gear 31 so as to rotate integrally. The input shaft 2 is connected to the carrier 34 so as to rotate integrally. The engine 11 is connected to the carrier 34 via the input shaft 2. The output gear 4 that outputs torque from the planetary gear mechanism 3 toward the wheels 14 is integrated with the ring gear 32. The output gear 4 is an external gear that rotates integrally with the ring gear 32, and meshes with a counter driven gear 5a of the counter gear mechanism 5.

The output gear 4 is connected to the differential gear mechanism 6 via the counter gear mechanism 5. The counter gear mechanism 5 has the counter driven gear 5a meshing with the output gear 4, a counter shaft 5b arranged parallel to the input shaft 2, and a counter drive gear 5c meshing with a ring gear 6a of the differential gear mechanism 6. The counter driven gear 5a and the counter drive gear 5c are attached to the counter shaft 5b so as to rotate integrally. The wheels 14 are connected to the differential gear mechanism 6 via left and right drive shafts 7.

Further, the vehicle Ve adds torque output by the second motor 13 to torque transmitted from the engine 11 to the wheels 14. The second motor 13 includes a stator 13a around which a coil is wound, a rotor 13b, and a rotor shaft 13c. The rotor shaft 13c is arranged parallel to the counter shaft 5b. A reduction gear 9 meshing with the counter driven gear 5a is attached to the rotor shaft 13c so as to rotate integrally.

Further, the vehicle Ve includes a mechanical oil pump 41 in the case 8. The mechanical oil pump 41 is operated by the engine 11, and is operated by the rotation of a rotating shaft 42. The rotating shaft 42 rotates integrally with the input shaft 2. In a state where the input shaft 2 is rotating, such as a case where the engine 11 is driven, the mechanical oil pump 41 is operated. In this case, the lubricant discharged from the mechanical oil pump 41 is pressure-fed in the oil passage to be supplied to a lubrication-requiring portion and a cooling-requiring portion of the power transmission device 1. The lubrication-requiring portion includes the planetary gear mechanism 3.

The rotating shaft 42 is a hollow shaft, and has an axial oil passage extending in the axial direction, and a radial oil passage that extends in the radial direction from the axial oil passage and is open on an outer peripheral surface of the rotating shaft 42 (neither is illustrated) therein. The axial oil passage of the rotating shaft 42 communicates with a discharge port of the mechanical oil pump 41. The lubricant discharged from the discharge port of the mechanical oil pump 41 is pressure-fed in the axial oil passage of the rotating shaft 42 to be supplied to the planetary gear mechanism 3 via the radial oil passage of the rotating shaft 42. In this manner, in a case where the mechanical oil pump 41 is driven, the lubricant that is pressure-fed from the mechanical oil pump 41 via the axial oil passage of the rotating shaft 42 and the like is supplied to the lubrication-requiring portion of the power transmission device 1.

In addition, in the vehicle Ve, since EV traveling in which the engine 11 is stopped and the vehicle travels using only the motor as a power source is possible, in a state where the input shaft 2 is stopped and the mechanical oil pump 41 is not operated, it is necessary to supply the lubricant to the rotating body (lubrication-requiring portion) of the power transmission device 1. In this case, scraping lubrication is performed by the differential gear mechanism 6. The power transmission device 1 has a triaxial structure, and includes the input shaft 2 as a first shaft, the rotor shaft 13c as a second shaft, and the drive shaft 7 as a third shaft.

Figure 2:
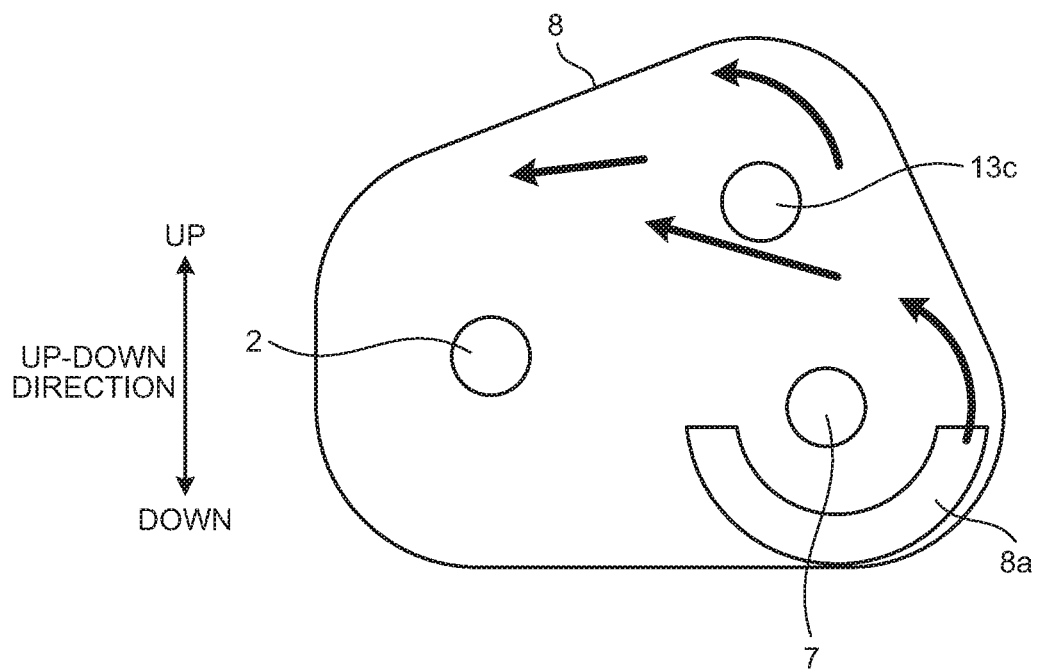
FIG. 2 is a schematic diagram illustrating lubricant scattered inside a case due to scraping lubrication.

FIG. 2 is a schematic diagram illustrating the lubricant scattered inside the case due to the scraping lubrication. Arrows illustrated in FIG. 2 indicate the direction in which the lubricant that has been scraped is scattered inside the case 8.

As illustrated in FIG. 2, in the case 8, in a case where the differential gear mechanism 6 on the drive shaft 7 rotates, the lubricant accumulated on a bottom portion 8a of the case 8 is scraped. Then, the scraped lubricant is scattered in the case 8 to be supplied to the rotating body provided on a rotor shaft 13c of the second motor 13 and a rotating body provided on the input shaft 2 (including the planetary gear mechanism 3).

In the planetary gear mechanism 3, during the EV traveling in which the engine 11 is stopped and the motor is used as a power source, the sun gear 31 and the ring gear 32 rotate in a state where the carrier 34 is stopped.

For this reason, it is desired that the planetary gear mechanism 3 is lubricated with the lubricant supplied by the scraping lubrication, and that the lubricant is efficiently used in the planetary gear mechanism 3 to lubricate the lubrication-requiring portion. Therefore, the planetary gear mechanism 3 is provided with an oil receiver 50 (illustrated in FIG. 3) as a member for efficiently using the lubricant.

Here, with reference to FIGS. 3 to 6, the structure of the planetary gear mechanism 3 included in the lubrication-requiring portion and the structure of the oil receiver 50 will be described. The radial direction of the ring gear 32 is the same as the radial direction of the input shaft 2, the radial direction of the sun gear 31, and the radial direction of the rotating shaft 42, but is different from the radial direction of the pinion gear 33.

Figure 3:
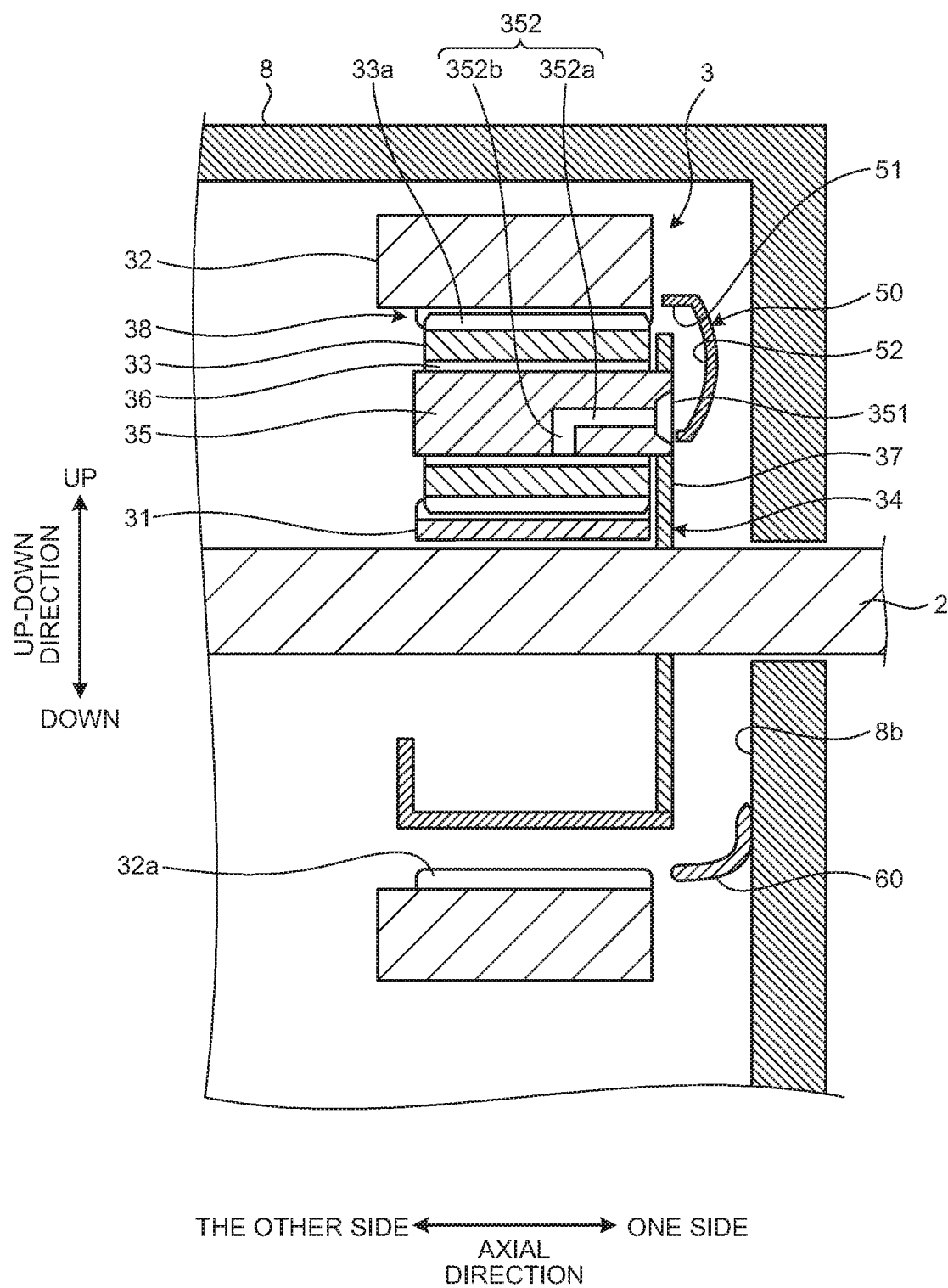
FIG. 3 is a cross-sectional view schematically illustrating a planetary gear mechanism arranged in a case.
Figure 4:
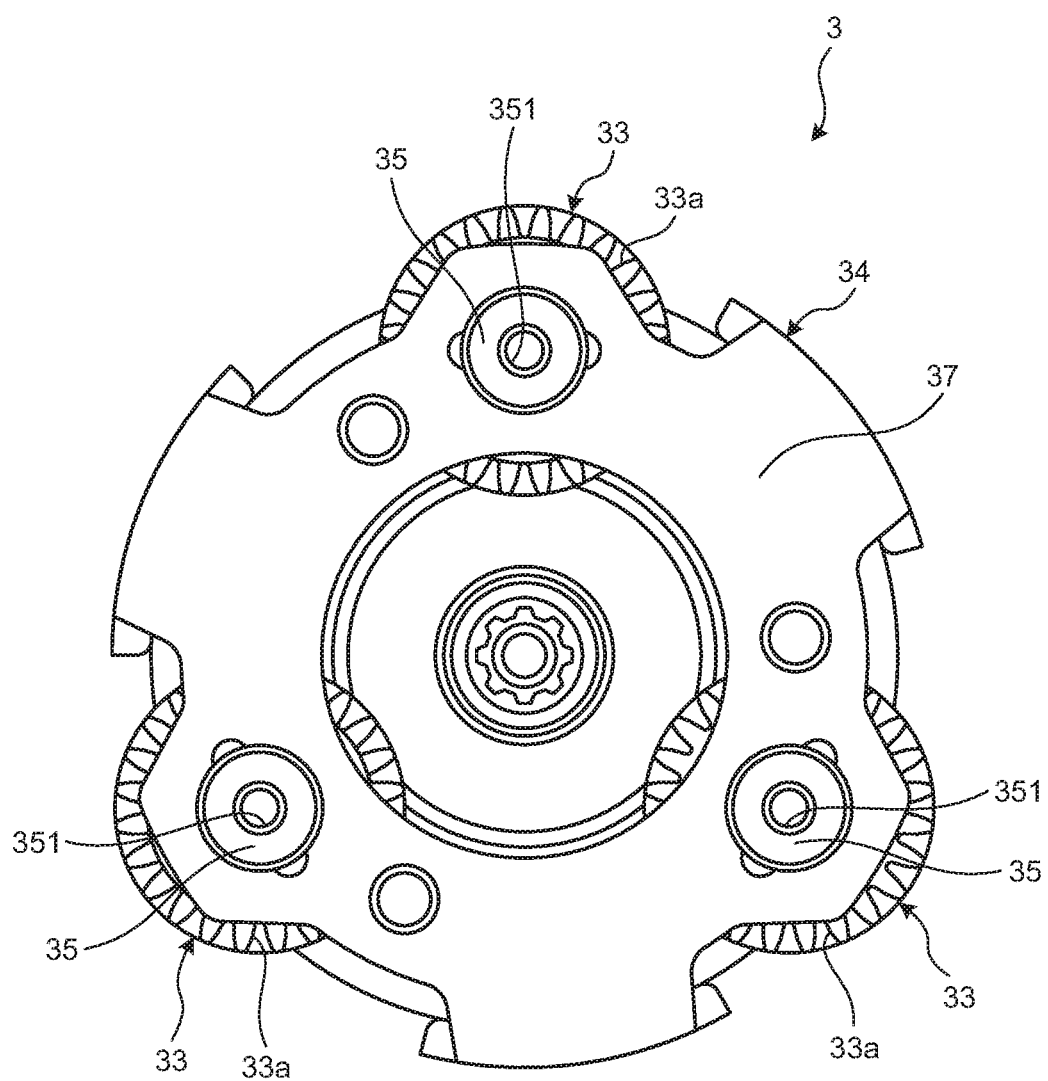
FIG. 4 is an explanatory diagram illustrating a structure of a carrier.

As illustrated in FIG. 3, the planetary gear mechanism 3 includes a plurality of pinion gears 33, pinion shafts 35 supporting the pinion gears 33 in a rotatable manner, bearings 36, and a carrier plate 37.

The carrier plate 37 is included in the carrier 34. In the example illustrated in FIG. 4, three pinion gears 33 are arranged at equal intervals in the circumferential direction of the carrier plate 37, and the pinion shafts 35 corresponding to the respective pinion gears 33 are fixed to the carrier plate 37. The carrier plate 37 is a member that holds a plurality of pinion shafts 35. In each of the pinion shafts 35, a portion on one side in the axial direction is fixed to the carrier plate 37.

A bearing 36 is attached to each of the pinion shafts 35. For example, the bearing 36 is configured by a roller bearing such as a needle bearing. The bearing 36 is arranged between the inner peripheral surface of the pinion gear 33 and the outer peripheral surface of the pinion shaft 35. The pinion gear 33 is rotatably supported on the pinion shaft 35 by the bearing 36.

The bearing 36 is the lubrication-requiring portion, and the lubricant is supplied in the case 8. In the lubrication structure of the power transmission device 1, the lubricant is supplied to the inner peripheral surface of the pinion gear 33 and the bearing 36.

The pinion shaft 35 has an opening 351, which is open, at one end portion in the axial direction, and an oil passage 352 that communicates with the opening 351 and supplies the lubricant flowing from the opening 351 to the bearing 36. The opening 351 is formed at the rotation center of the pinion shaft 35. The oil passage 352 includes a first oil passage 352a extending in the pinion shaft 35 in the axial direction, and a second oil passage 352b extending from the first oil passage 352a in the radial direction. The first oil passage 352a communicates with the opening 351. The second oil passage 352b communicates with an outlet that is open on the outer peripheral surface of the pinion shaft 35. The lubricant flowing from the opening 351 flows in the first oil passage 352a in the axial direction, then flows in the second oil passage 352b in the radial direction, and is supplied to the inner peripheral surface of the pinion gear 33 and the bearing 36.

The opening 351 of the pinion shaft 35 is open on the same plane as one end surface (side surface) of the carrier plate 37 in the axial direction. In order to guide the lubricant toward the opening 351, the oil receiver 50 is attached to the one end surface of the carrier plate 37 in the axial direction. The oil receiver 50 is fixed to the carrier plate 37, and can collect the lubricant scattered in the case 8 at a position near the pinion gear 33. When the carrier plate 37 rotates, the oil receiver 50 rotates integrally with the carrier plate 37.

The oil receiver 50 is a member for receiving the lubricant scattered outward in the radial direction of the ring gear 32 from a meshing portion 38 between the pinion gear 33 and the ring gear 32, and guiding the received lubricant to the opening 351 of the pinion shaft 35. As illustrated in FIG. 3, the oil receiver 50 has a receiving surface 51 that receives the lubricant scattered outward in the radial direction of the ring gear 32 from the meshing portion 38 and scattered in the one side in the axial direction, and a guide surface 52 that guides the lubricant received by the receiving surface 51 to the opening 351 of the pinion shaft 35.

The receiving surface 51 is arranged at a position outward of the meshing portion 38 in the radial direction of the ring gear 32 to face inward in the radial direction of the ring gear 32. Further, the receiving surface 51 is formed over a predetermined range in the circumferential direction of the ring gear 32. Further, the receiving surface 51 is arranged at a position away from the meshing portion 38 to the one side in the axial direction.

The guide surface 52 has a curved shape that guides the lubricant to the opening 351 of the pinion shaft 35 by using the dynamic pressure of the lubricant scattered from the meshing portion 38. The guide surface 52 is arranged at a position facing the meshing portion 38 and at a position facing the opening 351 of the pinion shaft 35 in the axial direction. Therefore, the guide surface 52 can receive the lubricant scattered from the meshing portion 38 to the one side in the axial direction. Further, the guide surface 52 is configured to face the one end surface (side surface) of the carrier plate 37 in the axial direction.

Figure 5:
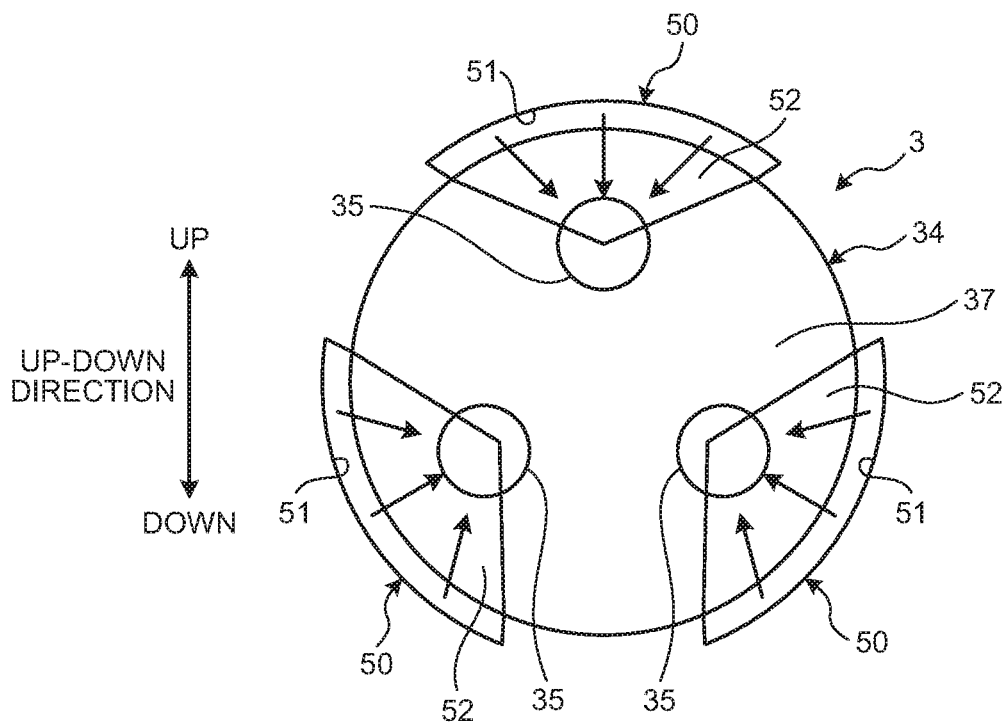
FIG. 5 is a skeleton diagram schematically illustrating a plurality of oil receivers.

Further, as illustrated in FIG. 5, when the planetary gear mechanism 3 is viewed from the axial direction of the pinion shaft 35, the guide surface 52 is formed in a fan shape in the circumferential direction of the pinion gear 33 so as to move the lubricant radially inward of the carrier plate 37. The main portion of the fan shape, that is, the portion of the guide surface 52, which is positioned on the innermost side in the radial direction of the carrier plate 37, functions as a portion for introducing the lubricant into the opening 351 of the pinion shaft 35. FIG. 5 illustrates a case where the oil receiver 50 is viewed from one side to the other side in the axial direction of the pinion shaft 35, and a state where the receiving surface 51 and the guide surface 52 arranged on the back side (the other side) in the axial direction are visible.

A plurality of oil receivers 50 are arranged at positions corresponding to the plurality of pinion shafts 35. At positions corresponding to the respective pinion shafts 35, a plurality of oil receivers 50 are provided at predetermined intervals in the circumferential direction of the carrier plate 37. Each oil receiver 50 can collect and guide the lubricant toward the opening 351 of the pinion shaft 35.

Figure 6:
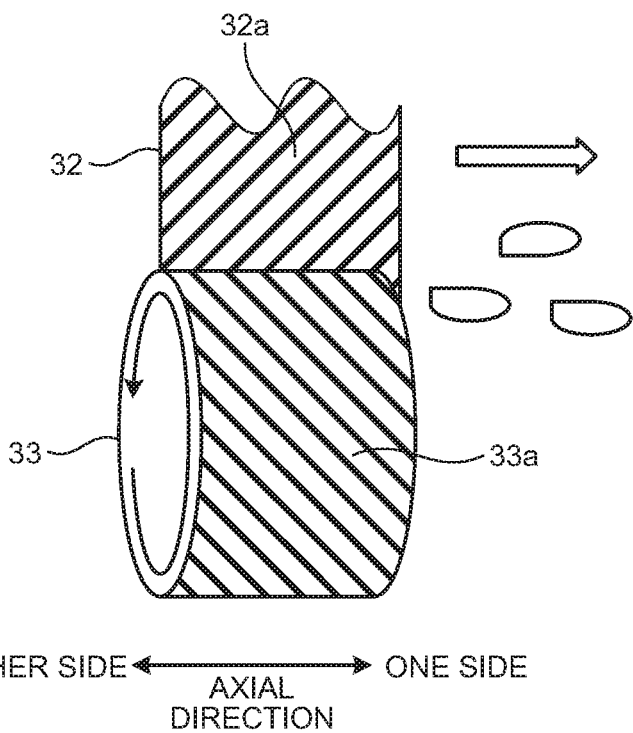
FIG. 6 is a schematic diagram illustrating a relationship between a torsion direction of a helical gear and a direction in which lubricant is scattered.

As illustrated in FIG. 6, the pinion gear 33 is formed by a helical gear. That is, the sun gear 31 and the ring gear 32 are formed by helical gears. In the helical gear, the tooth trace is oblique (twisted) with respect to the axial direction. Note that the arrow and three droplets illustrated in FIG. 6 indicate that the oil scattered from the meshing portion 38 between the ring gear 32 and the pinion gear 33 is scattered to the one side in the axial direction.

The torsion direction of teeth 33a in the pinion gear 33 is set to a torsion direction in which the lubricant is scattered from the meshing portion 38 with the ring gear 32 toward the oil receiver 50 (one side in the example illustrated in FIG. 6) in the axial direction when the pinion gear 33 rotates. In the example illustrated in FIG. 6, the torsion direction of the pinion gear 33 is "right torsion", and the torsion direction of the ring gear 32 is "left torsion". As illustrated in FIG. 6, in a case where the pinion gear 33 rotates counterclockwise as viewed from the other side in the axial direction, the position where the same teeth 33a meshes with teeth 32a of the ring gear 32 moves from the other side to the one side in the axial direction.

The rotation direction of the above-described pinion gear 33 (counterclockwise in the example illustrated in FIG. 6) is a rotation direction when the ring gear 32 as an output element rotates in the forward direction when transmitting power via the planetary gear mechanism 3. That is, the torsion direction of the helical gear is set to a torsion direction in which the lubricant is scattered in the axial direction from the meshing portion 38 toward the oil receiver 50 when the pinion gear 33 rotates forward. With the rotation of the pinion gear 33, in the same teeth, the position where the teeth 33a of the pinion gear 33 meshes with the teeth 32a of the ring gear 32 is changed from the other side to the one side in the axial direction. Thus, the lubricant present in the same teeth space in the meshing portion 38 moves to the one side in the axial direction when the pinion gear 33 rotates, and the lubricant is scattered from the meshing portion 38 in the one side in the axial direction and outward in the radial direction of the ring gear 32.

Next, the movement of lubricant when the lubricant is supplied to the pinion gear 33 by scraping lubrication will be described with reference to FIG. 7.

Figure 7:
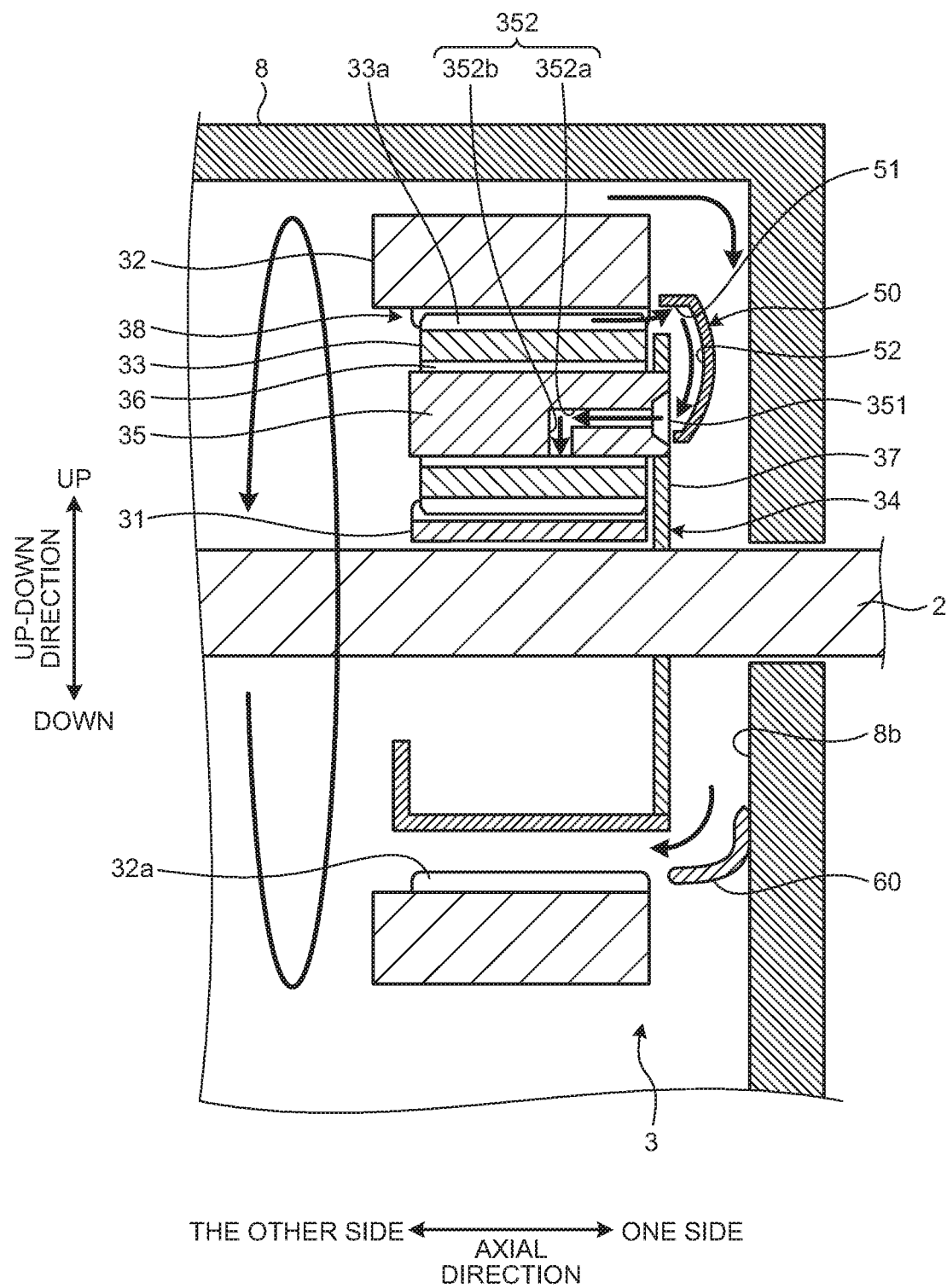
FIG. 7 is an explanatory diagram illustrating a state in which lubricant scattered from a meshing portion between a pinion gear and a ring gear is received by an oil receiver.

As illustrated in FIG. 7, the lubricant scattered in the case 8 by the scraping lubrication moves from an upper portion to a lower portion of the case 8 by gravity at a position near the planetary gear mechanism 3. A guide member 60 which receives the lubricant moving downward in the case 8 by gravity to guide the lubricant toward the planetary gear mechanism 3 in the axial direction is provided on a wall surface 8b of the case 8.

The guide member 60 is attached to the wall surface 8b, and has a shape for guiding the lubricant toward the teeth 32a of the ring gear 32 of the planetary gear mechanism 3.

The guide member 60 is fixed to the case 8 at a position not in contact with the oil receiver 50. In the example illustrated in FIG. 7, the guide member 60 is positioned below the input shaft 2 and between the teeth 32a of the ring gear 32 and the carrier plate 37 in the up-down direction, and is positioned at a location facing the end surface of the carrier plate 37 in the axial direction. Further, the guide member 60 has a guide surface that extends over a predetermined range in the circumferential direction of the ring gear 32 and protrudes from the wall surface 8b to the other side in the axial direction. The lubricant is configured to move from the guide member 60 toward the teeth 32a of the ring gear 32 by using the gravity acting on the lubricant. The guide member 60 causes the lubricant to move toward a portion where the teeth 32a of the ring gear 32 face upward. In short, the guide member 60 supplies the lubricant to a portion of the teeth 32a of the ring gear 32, which does not mesh with the pinion gear 33. By the rotation of the ring gear 32, the teeth 32a of the portion to which the lubricant is supplied can be the meshing portion 38 with the pinion gear 33.

Then, the lubricant supplied to the teeth 32a of the ring gear 32 moves toward the one side in the axial direction in the meshing portion 38 with the pinion gear 33. Therefore, the lubricant scattered from the meshing portion 38 between the pinion gear 33 and the ring gear 32 is scattered to the one side in the axial direction, and is also scattered outward in the radial direction of the ring gear 32 due to the centrifugal force of the ring gear 32. The lubricant scattered from the meshing portion 38 is received by the oil receiver 50.

The oil receiver 50 receives the lubricant scattered outward in the radial direction from the meshing portion 38 by the receiving surface 51, and causes the lubricant to move radially inward of the pinion gear 33 by using the dynamic pressure of the lubricant received by the receiving surface 51. In this case, the lubricant that has moved on the guide surface 52 by the dynamic pressure moves toward the opening 351 of the pinion shaft 35. In this manner, after the lubricant scattered from the meshing portion 38 between the pinion gear 33 and the ring gear 32 is collected by the oil receiver 50, the lubricant is guided from the oil receiver 50 to the opening 351 of the pinion shaft 35. Since the guide surface 52 and the opening 351 face each other in the axial direction, the oil receiver 50 can cause the lubricant to move from the guide surface 52 toward the opening 351 in the axial direction.

The lubricant flowing into the first oil passage 352a from the opening 351 of the pinion shaft 35 is supplied to the bearing 36 and the inner peripheral surface of the pinion gear 33 from the outlet of the second oil passage 352b. Thus, even in a state where the carrier 34 is stopped, in a case where the pinion gear 33 rotates, the lubricant scattered outward in the radial direction from the meshing portion 38 between the pinion gear 33 and the ring gear 32 can be received by the oil receiver 50 and the lubricant can be supplied to the inner peripheral surface of the pinion gear 33 and the bearing 36.

As described above, according to the embodiment, the lubricant scattered outward in the radial direction from the meshing portion 38 between the pinion gear 33 and the ring gear 32 can be received by the oil receiver 50 and can be guided to the opening 351 of the pinion shaft 35. Therefore, it is possible to increase the amount of lubricant supplied to the inner peripheral surface of the pinion gear 33 and the bearing 36. Thus, even in a state where the carrier 34 is stopped, it is possible to ensure the lubrication ability between the pinion gear 33 and the bearing 36, and the pinion shaft 35.

Here, a modification example of the power transmission device 1 will be described with reference to FIGS. 8 to 11. The power transmission device 1 of the modification example has an oil passage structure in which a plate oil passage 371 is provided in the carrier plate 37 and the oil passages 352 of the pinion shafts 35 communicate with each other through the plate oil passage 371.

Figure 8:
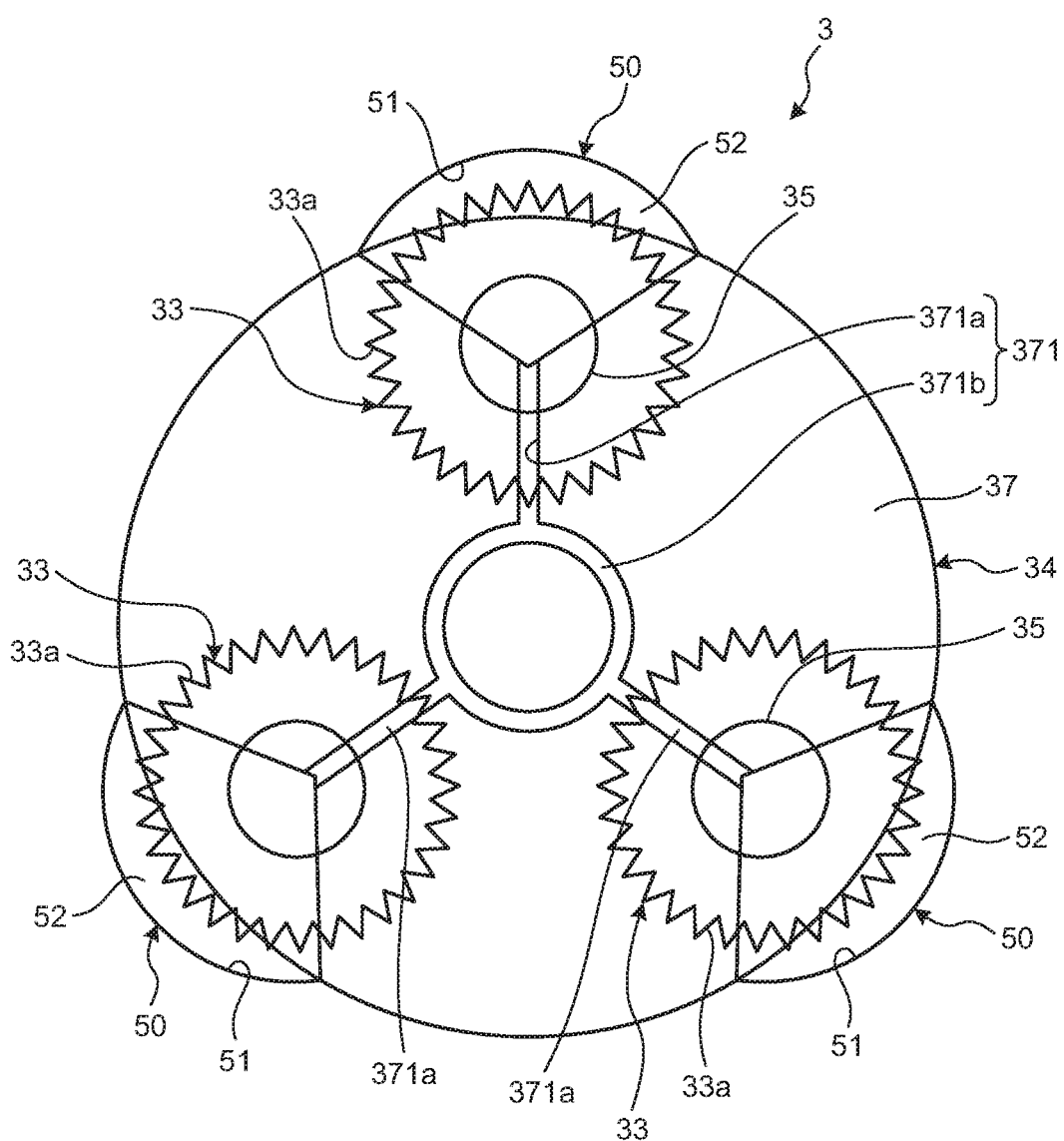
FIG. 8 is a skeleton diagram schematically illustrating a plate oil passage provided in a carrier plate.
Figure 9:
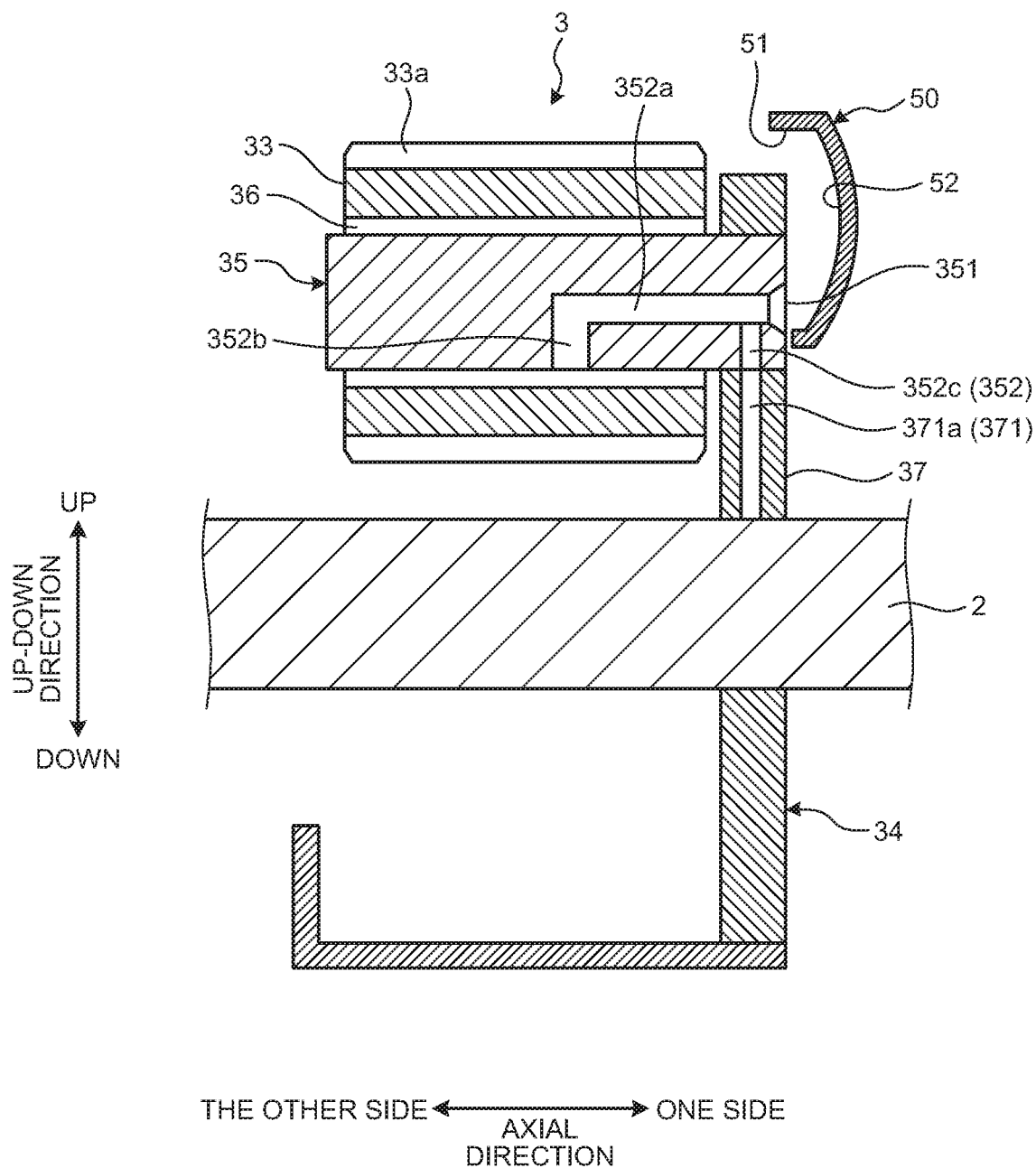
FIG. 9 is a cross-sectional view illustrating an oil passage structure of a carrier plate.

As illustrated in FIGS. 8 and 9, the plate oil passage 371 which causes the oil passages 352 of the pinion shafts 35 to communicate with each other is formed inside the carrier plate 37. The plate oil passage 371 has a radial oil passage 371a that communicates with the first oil passage 352a of each pinion shaft 35, and a circumferential oil passage 371b that causes the inner peripheries of each radial oil passage 371a to communicate with each other. The radial oil passage 371a extends linearly along the radial direction of the carrier plate 37. The circumferential oil passage 371b extends annularly along the circumferential direction of the carrier plate 37. FIG. 8 illustrates a skeleton diagram as in FIG. 5 described above.

For example, as illustrated in FIG. 9, the radial oil passage 371a is connected to a branch oil passage 352c formed on the pinion shaft 35. The branch oil passage 352c is an oil passage that branches radially inward from the first oil passage 352a, inside the pinion shaft 35. The branch oil passage 352c is provided at a position where the pinion shaft 35 is attached to the carrier plate 37 in the axial direction.

Figure 10:
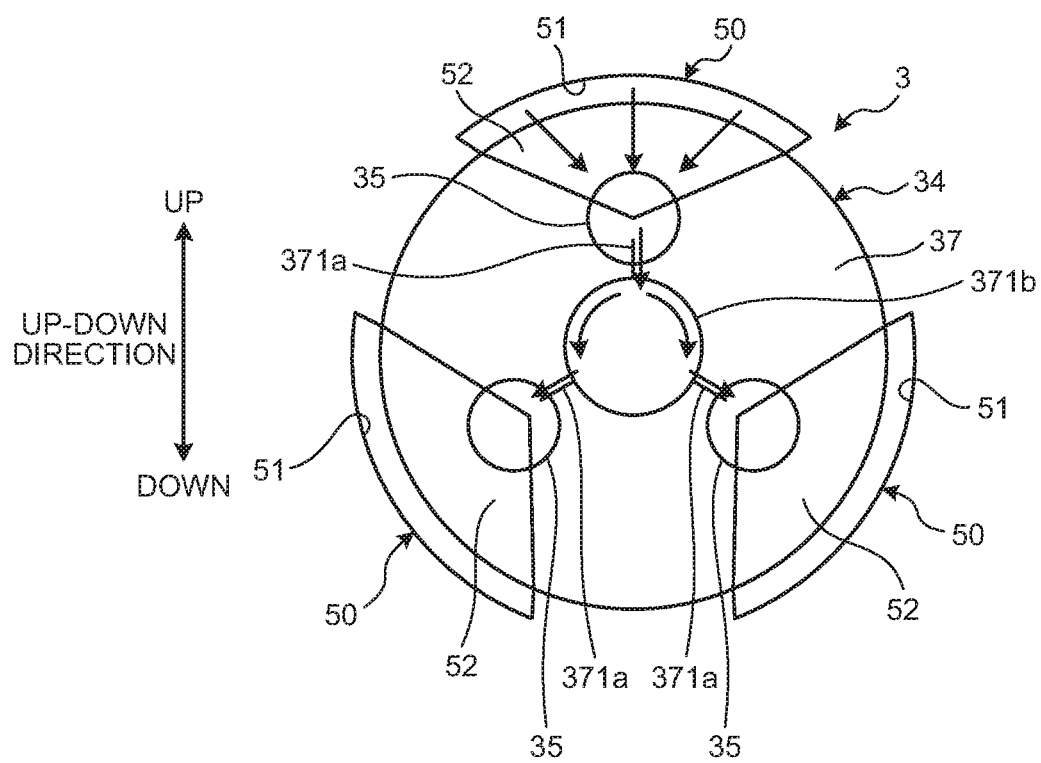
FIG. 10 is a skeleton diagram illustrating a state in which lubricant is supplied to a plurality of pinion shafts through a plate oil passage.

Further, in the modification example, as illustrated in FIG. 10, the lubricant which is guided to the opening 351 of the pinion shaft 35 by the oil receiver 50 positioned on the upper side in the up-down direction can be distributed to other pinion shafts 35 by the plate oil passage 371 of the carrier plate 37. That is, the plurality of pinion shafts 35, bearings 36, and pinion gears 33 are lubricated by using the lubricant collected by one oil receiver 50 positioned on the upper side of the case 8 in the up-down direction.

In this case, the power transmission device 1 includes a control device 100 that controls the stop position of the carrier plate 37. This control device 100 is an Electronic Control Unit (ECU), illustrated in FIG. 1, that controls the vehicle Ve. That is, the control device 100 includes a CPU having arithmetic and control functions, a ROM in which various programs and the like are installed in advance, and a RAM that stores arithmetic parameters and data for each process. In addition, signals from various sensors provided in the vehicle Ve are input to the control device 100. Further, the control device 100 executes various controls on the basis of the signals from the sensors.

For example, the control device 100 executes a stop position control of the engine 11 on the basis of an input signal (resolver signal) from a rotation angle sensor. In the vehicle Ve described above, the engine 11 and the first motor 12 are connected to the planetary gear mechanism 3. Therefore, the control device 100 can control the stop position of the engine 11 by controlling the rotation angle of the first motor 12. That is, the control device 100 can control the stop position of the input shaft 2 and the carrier 34 connected to the engine 11 by executing the stop position control of the engine 11. Therefore, the control device 100 controls the stop position of the carrier plate 37 such that one of the plurality of oil receivers 50 is stopped on the upper side in the up-down direction.

Figure 11:
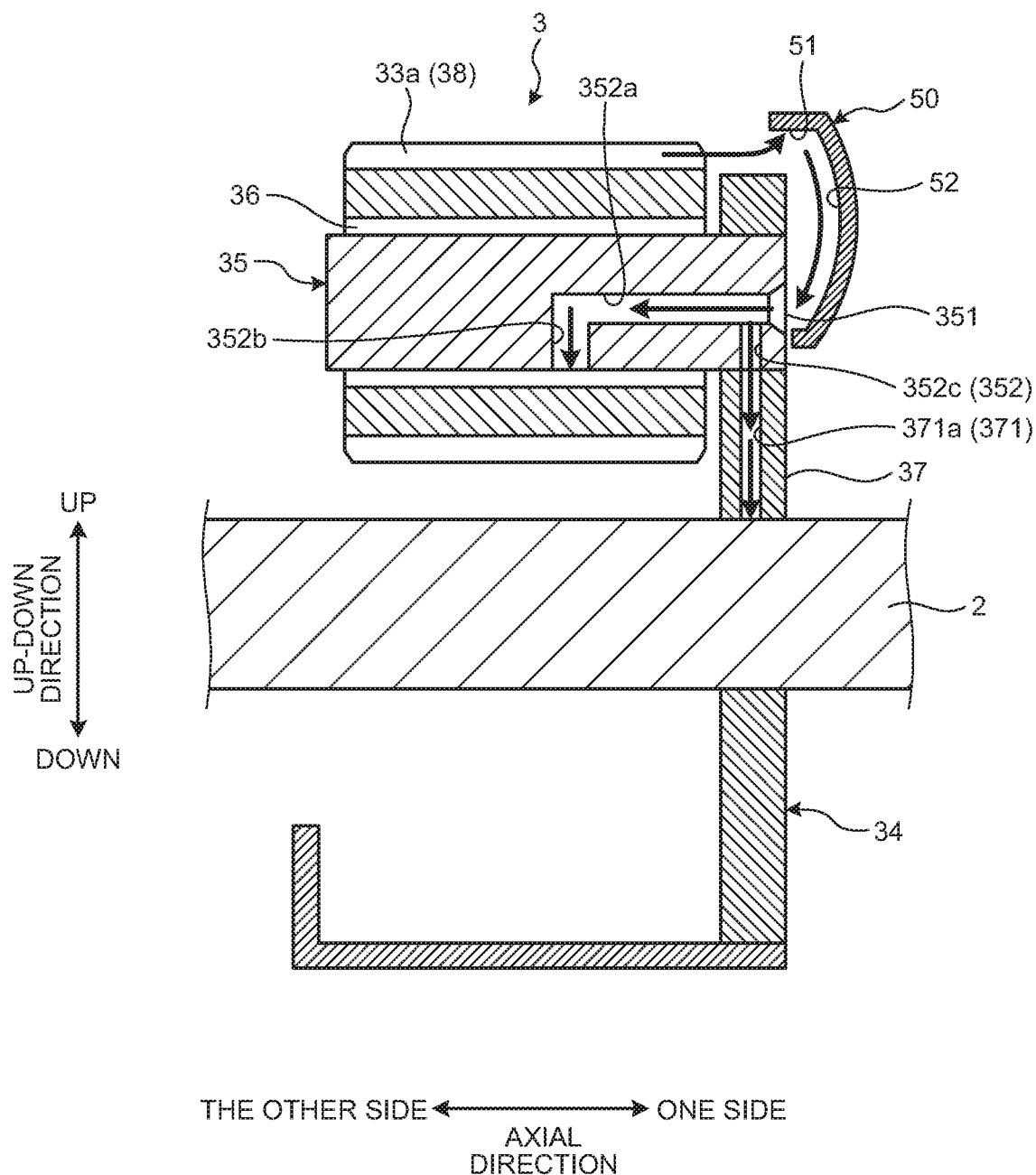
FIG. 11 is a cross-sectional view illustrating a state in which lubricant received by an oil receiver flows through a plate oil passage.

Then, as illustrated in FIG. 11, the lubricant which is guided from the oil receiver 50 to the opening 351 of the pinion shaft 35 flows in the first oil passage 352a from the opening 351 and flows in the plate oil passage 371 of the carrier plate 37 from the first oil passage 352a via the branch oil passage 352c.

In this manner, with the power transmission device 1 of the modification example, since the lubricant which is received by the oil receiver 50 positioned above the input shaft 2 in the up-down direction can be supplied to the oil passage 352 of the corresponding pinion shaft 35 and can be supplied to the plate oil passage 371 of the carrier plate 37, it is possible to also supply a sufficient amount of lubricant to the oil passages 352 of the other pinion shafts 35.

The shape of the oil receiver 50 described above is an example only, and the disclosure is not limited to this. For example, the receiving surface 51 may be provided over a predetermined range in the circumferential direction of the pinion gear 33. In this case, it is sufficient that the receiving surface 51 is configured to include a surface positioned outward of the meshing portion 38 in the radial direction of the ring gear 32.

Further, in the above-described embodiment, the pinion gear 33 is configured by a helical gear, but the disclosure is not limited to this. The pinion gear 33 is not limited to a helical gear, and may be configured by a spur gear. That is, the ring gear 32 and the sun gear 31 may be configured by spur gears. Even in a case where the meshing portion 38 is formed by meshing of spur gears, the lubricant is scattered outward in the radial direction of the ring gear 32 and both sides in the axial direction, from the meshing portion 38 during the rotation of the pinion gear 33.

In addition, the disclosure is not limited to a single pinion type planetary gear mechanism, and is also applicable to a double pinion type planetary gear mechanism. The double pinion type planetary gear mechanism includes a first pinion gear that meshes with the sun gear, and a second pinion gear that meshes with the first pinion gear and the ring gear 32. In case of the double pinion type planetary gear mechanism, the above-described oil receiver 50 is provided at a position corresponding to the second pinion gear for the second pinion gear meshing with the ring gear 32. In short, it is sufficient that the oil receiver 50 is arranged at a position corresponding to the meshing portion 38 between the ring gear 32 and the second pinion gear.

Further, the power transmission device 1 is not limited to the configuration of the vehicle Ve described above. The disclosure is not limited to a power transmission device having a triaxial structure or a power transmission device mounted on a hybrid vehicle. For example, the planetary gear mechanism 3 and the oil receiver 50 applied to a power transmission device in which the first motor 12 and the second motor 13 are arranged on the same rotation center axis may be used.

Figure 12:
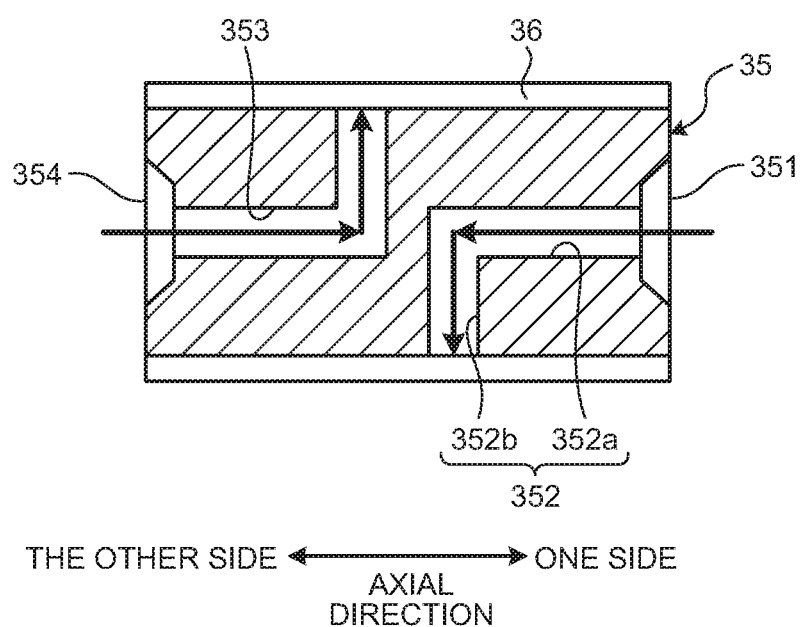
FIG. 12 is a cross-sectional view illustrating an oil passage structure of a pinion shaft.

As illustrated in FIG. 12, in addition to the above-described oil passage 352, an oil passage 353 connected to the mechanical oil pump 41 may be provided in the pinion shaft 35. The oil passage 353 communicates with an opening 354 that is open at the other end portion of the pinion shaft 35 in the axial direction. The lubricant can be supplied to the inner peripheral surface of the pinion gear 33 and the bearing 36 from both the oil passage 353, to which the lubricant is supplied from the mechanical oil pump 41, and the oil passage 352, to which the lubricant is supplied from the oil receiver 50. In this manner, in the pinion shaft 35, since the oil passage 352 is provided in a separate system from the oil passage 353 connected to the mechanical oil pump 41, it is possible to prevent the lubricant from flowing back to the oil passage 353 on the mechanical oil pump 41 side when the lubricant is supplied from the oil receiver 50 to the opening 351.

According to the present disclosure, it is possible to receive lubricant scattered outward in the radial direction of the ring gear from the meshing portion between the pinion gear and the ring gear at the time of rotation of the pinion gear by the oil receiver, to guide the lubricant to the opening of the pinion shaft. Therefore, even in a state where a carrier plate is stopped, at the time of rotation of the pinion gear, the lubricant scattered outward in the radial direction of the ring gear from the meshing portion due to centrifugal force can be efficiently collected by the oil receiver. Thus, it is possible to supply a sufficient amount of lubricant to the inner peripheral surface of the pinion gear when the pinion gear rotates.

According to an embodiment, since the receiving surface of the oil receiver is provided over a predetermined range in the circumferential direction of the ring gear, it is possible to efficiently collect the lubricant which is scattered outward in the radial direction of the ring gear from the meshing portion by the receiving surface.

According to an embodiment, since the pinion gear is configured by a helical gear and the torsion direction thereof is set to a torsion direction in which the lubricant is scattered from the meshing portion toward the oil receiver in the axial direction, it is possible to increase the amount of lubricant scattered from the meshing portion toward the oil receiver at the time of rotation of the pinion gear. Thus, it is possible to increase the amount of lubricant supplied from the oil receiver to the inner peripheral surface of the pinion gear.

According to an embodiment, since the guide surface has a curved shape that guides the lubricant to the opening of the pinion shaft by using a dynamic pressure of the lubricant scattered from the meshing portion, it is possible to reliably guide the lubricant from the guide surface to the opening of the pinion shaft by the dynamic pressure of the lubricant. Thus, it is possible to efficiently supply the lubricant which is received by the receiving surface to the inner peripheral surface of the pinion gear.

According to an embodiment, the lubricant received by the oil receiver which is positioned above the rotating shaft in the up-down direction flows in the plate oil passage of the carrier plate, and thereby it is possible to supply the lubricant to the oil passages of all of the pinion shafts. Thus, it is possible to supply a sufficient amount of lubricant to all of the pinion shafts and the pinion gears.

Although the disclosure has been described with respect to specific embodiments for a complete and clear disclosure, the appended claims are not to be thus limited but are to be construed as embodying all modifications and alternative constructions that may occur to one skilled in the art that fairly fall within the basic teaching herein set forth.

What is claimed is:

1. A power transmission device comprising:
a planetary gear mechanism having a sun gear, a ring gear, a plurality of pinion gears meshing with the ring gear, pinion shafts rotatably supporting the respective pinion gears, and a carrier plate holding the pinion shafts,
the pinion shaft each having an opening that is open on one end portion in an axial direction and an oil passage that communicates with the opening and supplies lubricant flowing from the opening to an inner peripheral surface of each of the pinion gears; and
oil receivers, which are attached to the carrier plate, configured to receive lubricant, which is scattered outward in a radial direction of the ring gear from a meshing portion between the pinion gears and the ring gear at a time of rotation of the pinion gears, and guide the lubricant to the opening, wherein the oil receivers each include:
- a receiving surface, arranged at a position outward of the meshing portion in the radial direction of the ring gear over a predetermined range in a circumferential direction of the ring gear to face inward in the radial direction of the ring gear, configured to receive the lubricant which is scattered outward in the radial direction from the meshing portion at the time of rotation of the pinion gears, and
- a guide surface, arranged to face the meshing portion and the opening in the axial direction, configured to guide the lubricant received by the receiving surface to the opening.

2. The power transmission device according to claim 1, wherein each of the pinion gears is a helical gear, and
a torsion direction of the helical gear is set to a torsion direction in which the lubricant is scattered from the meshing portion toward the oil receiver in the axial direction at the time of rotation of the pinion gear.

3. The power transmission device according to claim 1, wherein the guide surface has a curved shape that guides the lubricant to the opening by using a dynamic pressure of the lubricant scattered from the meshing portion.

4. The power transmission device according to claim 1, further comprising:
- a rotating shaft that is connected to the carrier plate to rotate integrally therewith; and
- a control device that controls a stop position of the carrier plate, wherein the carrier plate includes a plate oil passage formed therein, which causes oil passages provided in the pinion shaft to communicate with each other, a plurality of the oil receivers are provided at positions corresponding to the plurality of pinion gears, and the control device is configured to control the stop position of the carrier plate such that any one of the plurality of oil receivers is positioned above the rotating shaft in an up-down direction when the carrier plate is stopped.

* * * * *